United States Patent
Kolosick

(10) Patent No.: US 11,142,156 B2
(45) Date of Patent: Oct. 12, 2021

(54) DRIVER AIRBAG MOUNTING VERIFICATION SYSTEM

(71) Applicant: TRW Vehicle Safety Systems Inc., Washington, MI (US)

(72) Inventor: Michael D. Kolosick, Roseville, MI (US)

(73) Assignee: TRW VEHICLE SAFETY SYSTEMS INC., Washington, MI (US)

( * ) Notice: Subject to any disclaimer, the term of this patent is extended or adjusted under 35 U.S.C. 154(b) by 301 days.

(21) Appl. No.: 16/327,400

(22) PCT Filed: Aug. 29, 2016

(86) PCT No.: PCT/US2016/049180
§ 371 (c)(1),
(2) Date: Feb. 22, 2019

(87) PCT Pub. No.: WO2018/044254
PCT Pub. Date: Mar. 8, 2018

(65) Prior Publication Data
US 2019/0225178 A1 Jul. 25, 2019

(51) Int. Cl.
*B60R 21/203* (2006.01)
(52) U.S. Cl.
CPC ........ *B60R 21/2037* (2013.01); *B60R 21/203* (2013.01)
(58) Field of Classification Search
CPC .............................. B60R 21/2037; B60Q 5/003
See application file for complete search history.

(56) References Cited

U.S. PATENT DOCUMENTS

| | | | | |
|---|---|---|---|---|
| 5,738,369 A * | 4/1998 | Durrani | ................. | B60Q 5/003 280/728.2 |
| 6,402,193 B1 * | 6/2002 | Fleckenstein | .......... | B60Q 5/003 200/61.55 |
| 6,554,312 B2 * | 4/2003 | Sakane | ................. | B60Q 5/003 280/728.2 |
| 6,675,675 B1 * | 1/2004 | Sauer | ................. | B60R 21/2037 280/731 |

(Continued)

FOREIGN PATENT DOCUMENTS

| | | | | |
|---|---|---|---|---|
| DE | 102013008819 A1 * | 11/2014 | ......... | B60R 21/2037 |
| DE | 112006004085 B4 * | 7/2020 | ......... | B60R 21/2037 |

(Continued)

*Primary Examiner* — Nicole T Verley
(74) *Attorney, Agent, or Firm* — Tarolli, Sundheim, Covell & Tummino LLP

(57) ABSTRACT

A driver airbag mounting verification system comprises a portion of an electrical circuit configured to connect a vehicle horn to a vehicle-mounted power source. The portion of the electrical circuit includes two electrical contacts resiliently biased into contact with one another so as to complete electrically the electrical circuit and thereby to actuate the vehicle horn. The portion of the electrical circuit including both of the electrical contacts is mounted on one of a driver airbag module and a vehicle steering wheel. At least one of the electrical contacts is mounted such that said at least one of the electrical contacts is moved and held out of contact with the other of the electrical contacts when the driver airbag module is securely mounted on the vehicle steering wheel.

14 Claims, 6 Drawing Sheets

(56) References Cited

U.S. PATENT DOCUMENTS

| | | | |
|---|---|---|---|
| 6,830,263 B2 * | 12/2004 | Xu | B60R 21/2037 280/728.2 |
| 7,159,897 B2 * | 1/2007 | Worrell | B60Q 5/003 200/61.55 |
| 7,478,830 B2 * | 1/2009 | Weigand | B60Q 5/003 200/61.54 |
| 7,490,852 B2 * | 2/2009 | Marotzke | B60Q 5/003 280/731 |
| 7,621,560 B2 * | 11/2009 | Spencer | B60R 21/2037 200/61.54 |
| 8,087,691 B2 * | 1/2012 | Nebel | B60R 21/2037 280/731 |
| 8,336,911 B2 * | 12/2012 | Hondier | B60R 21/2037 280/731 |
| 8,419,052 B2 * | 4/2013 | Yamaji | B60R 21/2037 280/731 |
| 8,448,982 B2 * | 5/2013 | Yamaji | B60R 21/2037 280/731 |
| 8,474,867 B2 * | 7/2013 | Nebel | B60R 21/2037 280/731 |
| 8,616,577 B1 * | 12/2013 | Matsu | B60R 21/2037 280/728.2 |
| 9,592,783 B2 * | 3/2017 | Nebel | B60R 21/217 |
| 9,725,063 B2 * | 8/2017 | Collazo | B60R 21/2037 |
| 10,391,934 B2 * | 8/2019 | Leforestier | H03K 17/9625 |
| 2004/0119582 A1 | 6/2004 | Schutz et al. | |
| 2005/0227525 A1 | 10/2005 | Sugimoto | |
| 2006/0175816 A1 | 8/2006 | Spencer et al. | |
| 2010/0059974 A1 | 3/2010 | Chevalier et al. | |
| 2012/0279835 A1 * | 11/2012 | Shellabarger | H01H 3/142 200/61.55 |
| 2012/0305371 A1 | 12/2012 | Chevalier et al. | |
| 2020/0189657 A1 * | 6/2020 | Gothekar | B60Q 5/003 |

FOREIGN PATENT DOCUMENTS

| | | | | |
|---|---|---|---|---|
| FR | 2693870 A1 | * | 1/1994 | H01H 11/0056 |
| GB | 2309123 A | * | 7/1997 | B60Q 5/003 |
| GB | 2398277 A | * | 8/2004 | B60R 21/21658 |
| JP | 6180836 B2 | * | 8/2017 | |
| WO | WO-2018046336 A1 | * | 3/2018 | B60Q 5/003 |
| WO | WO-2019183167 A1 | * | 9/2019 | B60R 21/2037 |
| WO | WO-2020053248 A1 | * | 3/2020 | B60Q 5/003 |

* cited by examiner

DRIVER AIRBAG MOUNTING VERIFICATION SYSTEM

RELATED APPLICATION

This application corresponds to PCT/US2016/049180, filed Aug. 29, 2016, the subject matter of which is incorporated herein by reference in its entirety.

FIELD OF THE INVENTION

The present invention relates to a system for verifying that an airbag module is securely mounted on a vehicle steering wheel and, more particularly, to a mounting verification system in which electrical contacts that are biased into contact with one another to actuate the vehicle horn are held out of contact when the airbag module is securely mounted on the steering wheel.

BACKGROUND OF THE INVENTION

To help protect a driver of an automobile or other vehicle in a crash, an airbag module may be mounted on the steering wheel for the vehicle. Such an airbag module will typically include an inflatable airbag, an inflator for generating or releasing gas to inflate the airbag, and a cover for protecting and concealing the airbag and the inflator when the airbag is not deployed. Although such an airbag module may be attached to a vehicle steering wheel using threaded metal fasteners, it is also known to attach an airbag module to a steering wheel using attachment hooks that protrude from one of the airbag module and the steering wheel and that engage a resilient wire secured to the other of the airbag module and the steering wheel.

By properly positioning the airbag module relative to the vehicle steering wheel, and then pressing the airbag module toward the vehicle steering wheel, the resilient wire of the foregoing hook-and-wire type of attachment system will first be deflected by the leading edges of the attachment hooks and then will spring back into engagement with the basket portions of the hooks. Such a hook-and-wire attachment system is advantageous in that it can be employed without the need to view the surface of the steering wheel opposite the airbag module as might be required, for example, to position a threaded attachment fastener or nut on the steering wheel. At the same time, because such an attachment mechanism works without visual observation of the final attachment position, it is important to provide a positive, non-visual cue that the attachment of the airbag module to the steering wheel is complete and secure.

SUMMARY OF THE INVENTION

The present invention is directed to a system for verifying that an airbag module is securely mounted on a vehicle steering wheel and, more particularly, to a mounting verification system in which electrical contacts that are biased into contact with one another to actuate the vehicle horn are held out of contact when the airbag module is securely mounted on the steering wheel.

In accordance with an embodiment of the present invention, a driver airbag mounting verification system comprises a portion of an electrical circuit configured to connect a vehicle horn to a vehicle-mounted power source. The portion of the electrical circuit includes two electrical contacts resiliently biased into contact with one another so as to complete the electrical circuit and thereby to actuate the vehicle horn. The portion of the electrical circuit including both of the two electrical contacts is mounted on one of a driver airbag module and a vehicle steering wheel. At least one of the two electrical contacts is mounted such that the at least one of the two electrical contacts is moved and held out of contact with the other of the two electrical contacts when the driver airbag module is securely mounted on the vehicle steering wheel.

In accordance with another embodiment of the present invention, a driver airbag mounting verification system comprises a portion of a horn actuation circuit configured to connect a vehicle horn to a vehicle-mounted power source. The portion of the horn actuation circuit includes plural first electrical contacts that are normally spaced apart. The horn actuation circuit is electrically completed so as to actuate the vehicle horn when at least two of the normally spaced apart first electrical contacts are brought into contact with one another. The driver airbag mounting verification system also comprises a short circuit device electrically connected in parallel with the at least two of the normally spaced apart first electrical contacts. The short circuit device includes two second electrical contacts resiliency biased into contact with one another so as to complete the horn actuation circuit and thereby to actuate the vehicle horn. The short circuit device including both of the two second electrical contacts is mounted on one of a driver airbag module and a vehicle steering wheel. At least one of the two second electrical contacts is mounted such that the at least one of the two second electrical contacts is moved and held out of contact with the other of the two second electrical contacts when the driver airbag module is securely mounted on the vehicle steering wheel.

BRIEF DESCRIPTION OF THE DRAWINGS

The foregoing and other features and advantages of the present invention will become apparent to one skilled in the art upon consideration of the following description of the invention and the accompanying drawings, in which.

DETAILED DESCRIPTION

Figure 1:
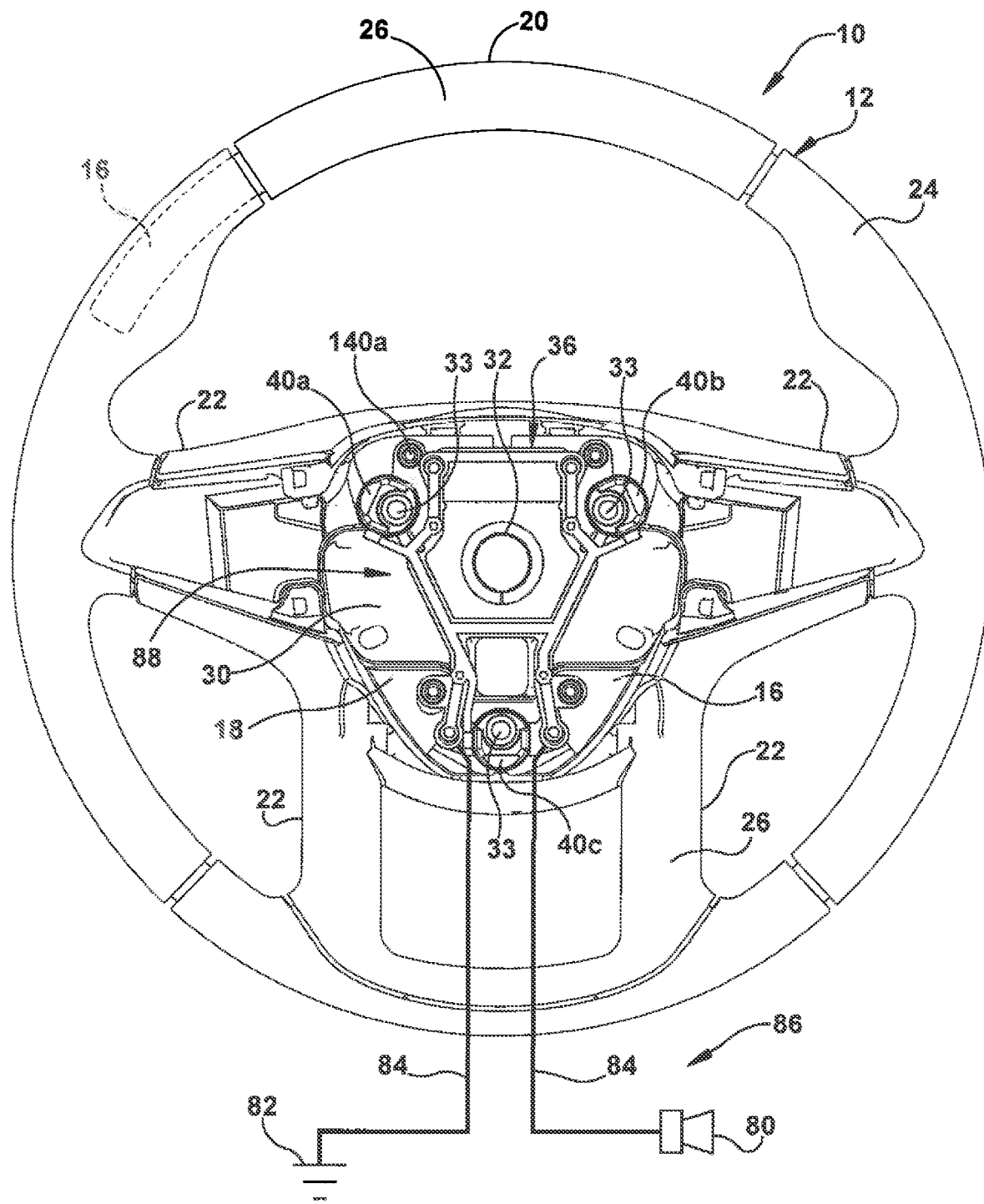
FIG. 1 is a plan view of a vehicle steering wheel, looking away from a vehicle driver, in accordance with an embodiment of the present invention.
Figure 2:
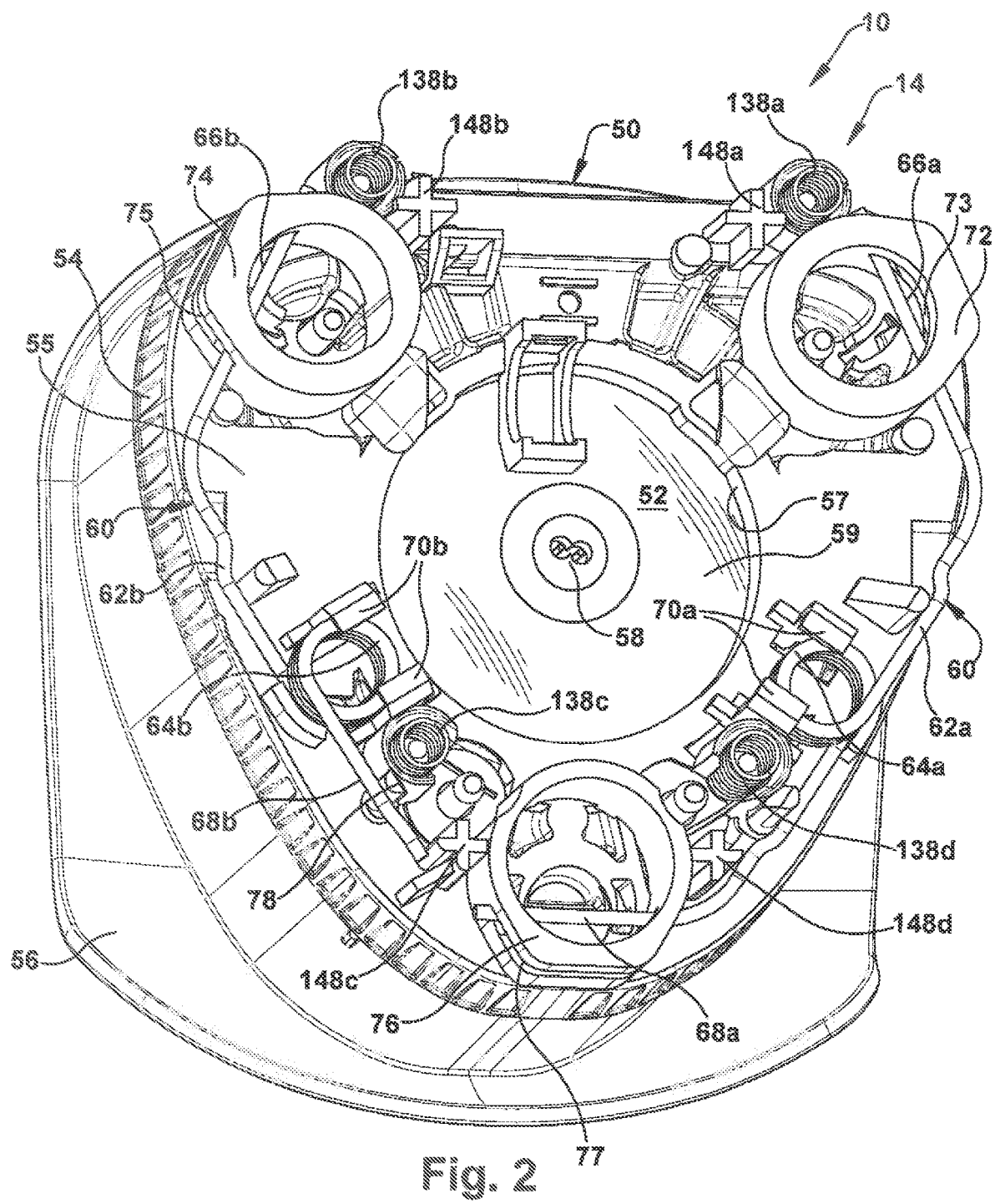
FIG. 2 is a perspective view of an airbag module, looking generally toward a vehicle driver, in accordance with the embodiment of the invention of FIG. 1.

FIGS. 1 and 2 illustrate a vehicle steering wheel assembly 10 that incorporates a driver airbag mounting verification system 150 (FIG. 4), in accordance with an example of the present invention. The vehicle steering wheel assembly 10 comprises a steering wheel 12 (FIG. 1) and a vehicle occupant protection device 14 (FIG. 2). The steering wheel 12 includes a steering wheel armature 18, which is typically made of a metal. The steering wheel 12 and the armature 16 include a hub portion 18, an annular rim portion 20 that extends circumferentially around the hub portion, and a plurality of spokes 22 that connect the rim portion to the hub portion. As illustrated in FIG. 1, the steering wheel 12 and the armature 16 include four spokes 22.

Left and right arcuate parts (as viewed in FIG. 1) of the rim portion 20 and at least a portion of the two uppermost spokes 22 of the armature 16 are covered with polyurethane foam (not shown) and an outer covering 24, which may be a wear-resistant layer formed of a polymer material or a material such as leather. Upper and lower arcuate parts (as viewed in FIG. 1) of the rim portion 20, the two lower spokes 22, and the remainder of the two upper spokes 22 are covered by a relatively rigid plastic material 26. Control devices, such as switches, for a vehicle radio (not shown) or another electrical or electronic device located off the steering wheel 12, may be mounted on or in the relatively rigid plastic material 26 covering the two upper spokes of the armature 16 of the steering wheel.

Figure 3:
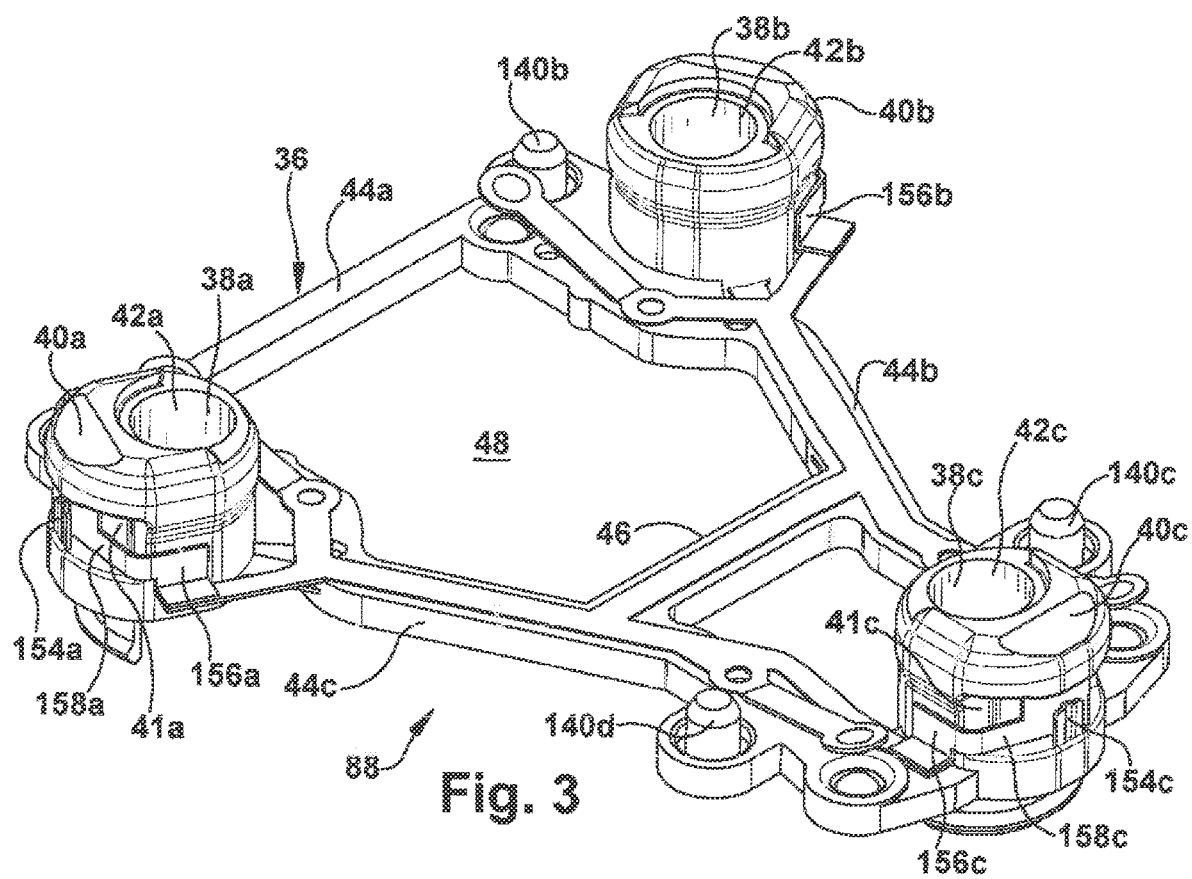
FIG. 3 is a perspective view of certain components of the vehicle steering wheel of FIG. 1.

The hub portion 18 of the armature 16 is generally planar and includes an upper surface 30 (as viewed in FIG. 1) and an opposite lower surface (not shown). A boss 32 extends through the hub portion 18 and away from the tower surface (not shown) of the hub portion. The boss 32 receives a portion of a steering column (not shown) of a vehicle (not shown) to attach the steering wheel 12 to the steering column. Three bolt holes 33 are formed in the hub portion 18 of the armature 16 in an array around the boss 32. The bolt holes 33 receive threaded bolts or other fasteners 34 (FIGS. 6 and 7) that project away from the upper surface 30 of the hub portion 18 of the armature 16 (toward the viewer, as shown in FIG. 1). The three bolts 34 are received in three openings 38*a*, 38*b*, 38*c* formed in the corners or vertices of a triangular plastic frame 36, which is best shown in FIG. 3.

The frame 36 includes three hook portions 40*a*, 40*b*, and 40*c*, which are formed in the three corners or vertices of the triangular shape of the frame. Each hook portion 40*a*, 40*b*, 40*c* has a cylindrical interior surface 42*a*, 42*b*, 42*c* that defines a different one of the openings 38*a*, 36*b*, 38*c*. The three hook portions 40*a*, 40*b*, 40*c* are joined by three connecting portions 44*a*, 44*b*, 44*c* that effectively form the three sides of the triangular shape of the frame 36. Each connecting portion 44*a*, 44*b*, 44*c* thus extends between and joins two of the three hook portions 40*a*, 40*b*, 40*c*. A reinforcing portion 46 of the frame 36 extends between and joins two of the connecting portions 44*b* and 44*c* that extend from the lowest of the three hook portions 40*c*, as viewed in FIG. 1. The hook portions 40*a*, 40*b*, 40*c*, the connecting portions 44*a*, 44*b*, 44*c*, and the reinforcing portion 46 of the frame 36 may all be formed or molded in one piece or they may be formed separately and then secured together to form the frame 36. As can be seen in FIG. 3, each of the hook portions 40*a*, 40*b*, 40*c* of the frame 36 is oriented to open laterally in a direction away from a central opening 48 defined by the frame. Such an orientation of the hook portions 40*a*, 40*b*, 40*c* facilitates engagement with the vehicle occupant protection device 14, in a manner described in more detail below.

The vehicle occupant protection device 14 shown in FIG. 2 is a driver airbag module 50. The driver airbag module 50 includes an inflatable airbag (not shown), an inflator 52 for inflating the airbag, a reaction plate 54 on which the inflator is mounted, and a cover 56 that is attached to the reaction plate 54 in manner such that the cover overlies and conceals the airbag and the inflator. The portions of the driver airbag module 50 that are presented toward and that will be engaged with the steering wheel 12 are presented toward the viewer in FIG. 2. As can be seen in FIG. 2, the reaction plate 54 includes a centrally located, circular surface 57 that defines a central opening 59 through the reaction plate. A center portion of the inflator 52 is exposed in the central opening. In the center portion of the inflator 52, as viewed in FIG. 2, is an end of an electrically actuatable initiator 58 for actuating the inflator in response to an electrical signal from a crash sensor (not shown), which may be in the form of an accelerometer. When the driver airbag module 50 is mounted on the steering wheel 12, an electrical conductor or cable (not shown) is connected to the initiator 58 and, via various cables (not shown) mounted on the vehicle (not shown), also to the crash sensor (not shown).

To enable the driver airbag module 50 to be securely mounted on and attached to the steering wheel 12, two flexible and resilient latch members 60 in the form of elongated spring wires 62*a* and 62*b* are secured to the reaction plate 54 adjacent a surface 55 of the reaction plate presented away from the inflator 52, the airbag (not shown), and the cover 56. As used in this application, "flexible" means that a material, such as the material of which the latch members 60 are made, is capable of being flexed, which is to say capable of being turned, bowed, or twisted without breaking. As used in this application, "resilient" means that a material, such as the material of which the latch members 60 are made, is capable of returning freely to a previous position, shape or condition, when is to say capable of recovering its size and shape after deformation.

The spring wire 62*a* includes a helically wound spring portion 64*a* located intermediate two end portions 66*a* and 68*a*. The spring portion 64*a* of the spring wire 62*a* is attached to the reaction plate 54 by clips 70*a* formed in one piece with the reaction plate. One end portion 66*a* of the spring wire 62*a* extends away from the spring portion 64*a* toward an annular guide member 72 that is formed in one piece with or securely fixed to the reaction plate 54 of the driver airbag module 50. A notch or slot 73 is formed in the side of the annular guide member 72 and receives the end portion 66*a* of the spring wire 62*a*. The opposite end portion 68*a* of the spring wire 62*a* also extends away from the spring portion 64*a*. Like the end portion 66*a*, the end portion 68*a* of the spring wire 62*a* toward an annular guide member 76 that is formed in one piece with or securely fixed to the reaction plate 54 of the driver airbag module 50. A notch or slot 77 is formed in the side of the annular guide member 76 and receives the end portion 68*a* of the spring wire 62*a*.

In a similar manner, the spring wire 62*b* includes a helically wound spring portion 64*b* located intermediate two end portions 66*b* and 68*b*. The spring portion 64*b* of the spring wire 62*b* is attached to the reaction plate 54 by clips 70*b* formed in one piece with the reaction plate. One end portion 66*b* of the spring wire 62*b* extends away from the spring portion 64*b* toward an annular glide member 74 that is formed in one piece with or securely fixed to the reaction plate 54 of the driver airbag module 50. A notch or slot 75 is formed in the side of the annular guide member 74 and receives the end portion 66*b* of the spring wire 62*b*. The opposite end portion 68*b* of the spring wire 62*b* also extends away from the spring portion 64*b*. Unlike the end portion 66*b*, the end portion 68*b* of the spring wire 62*b* engages a post 78. The post 78 is formed in one piece with the reaction plate 54 and holds the end portion 68*b* of the spring wife 62*b* in a position adjacent the outer periphery of the reaction plate 54.

When an end portion 66*a*, 66*b* or 68*b* is received in the slot 73, 75, or 77 of its corresponding guide member 72, 74, or 76, the guide member constrains movement of the end portion to a limited range of movement in directions axially toward and away from the reaction plate 54 and in a direction radially toward the central opening 59 in the reaction plate. Due to the biasing action of the spring portions 64*a*, 64*b*, each of the end portions 66*a*, 66*b*, 68*b* is normally maintained in a predetermined position fully seated in the slot 73, 75, 77 of its corresponding guide member 72, 74, 76. Each of the end portions 66*a*, 66*b*, 68*b* is also free to move or be deflected in a direction radially outward of its corresponding guide member 72, 74, or 76, in a direction radially away from the central opening 59 in the reaction plate 54, to facilitate mounting the driver airbag module 50 on the steering wheel 12 in a manner described in greater detail below.

When the driver airbag module 50 is to be mounted on the steering wheel 12, the driver airbag module is turned 180° from the orientation shown in FIG. 2 so that the cover 56 is presented away from the steering wheel and toward the vehicle seat (not shown) to be occupied by a vehicle driver. The driver airbag module 50 is then positioned relative to the steering wheel 12 such that the hook portions 40*a, b*, and *c* of the frame 36 are generally in alignment with the annular guide members 72, 74, and 76, respectively. The driver airbag module 50 is moved or pressed toward the steering wheel 12 so that the hook portions 40*a*, 40*b*, and 40*c* of the frame 36 are received in the corresponding guide members 12, 74, and 76, respectively.

As the hook portions 40*a*, 40*b*, and 40*c* move into the corresponding guide members 72, 74, and 76, respectively, the hook portions initially deflect the corresponding end portion 68*a*, 66*b*, and 68*a* of the spring wires 62*a*, 62*b*, and 62*c* radially outward away from the central opening 59 in the reaction plate 54. Subsequently, the end portions 66*a*, 66*b*, and 66*c* are able to return, under the resilient bias of the spring portions 64*a* and 64*b*, to their respective original or starting positions. The foregoing mounting process can be seen by comparing FIGS. 6 and 7, which show the hook portion 40*c* moving toward the end portion 68*a* of the spring wire 62*a* in FIG. 6 and the end portion 68*a* of the spring wire 62*a* returned to its initial position but received in the basket 41*c* of the hook portion 40*c*. The engagement between the hook portion 40*c* and the end portion 68*a* of the spring wire 62*a*, together with the similar engagement of the hook portions 40*a* and 40*b* with the end portions 66*a* and 66*b* of the spring wires 62*a* and 62*b*, respectively, securely mounts or attaches the driver airbag module 50 to the steering wheel 12.

The vehicle steering wheel assembly 10 also comprises a mechanism for actuating a vehicle horn 80, which is shown schematically in FIG. 1 and which is typically located in and mounted on a forward portion of a vehicle (not shown). To actuate the vehicle horn 80, the horn must be electrically connected to an electrical power source 82, typically the vehicle battery, which is also shown schematically in FIG. 1 and which is also typically located in and mounted on a forward portion of a vehicle (not shown), such as a wall of the vehicle engine compartment. Electrical conductors 84, such as wires or cables, extend through the vehicle (not shown) from the vehicle horn 80 to the steering wheel 12 and from the electrical power source 82 to the steering wheel. To complete the electrical circuit 86 that includes the vehicle horn 80, the electrical power source 82, and the electrical conductors 84, a switch mechanism 88 is mounted on and attached to the steering wheel 12. The switch mechanism 88, which is a portion of the electrical circuit 86, is best shown in FIGS. 3 and 4.

Figure 4:
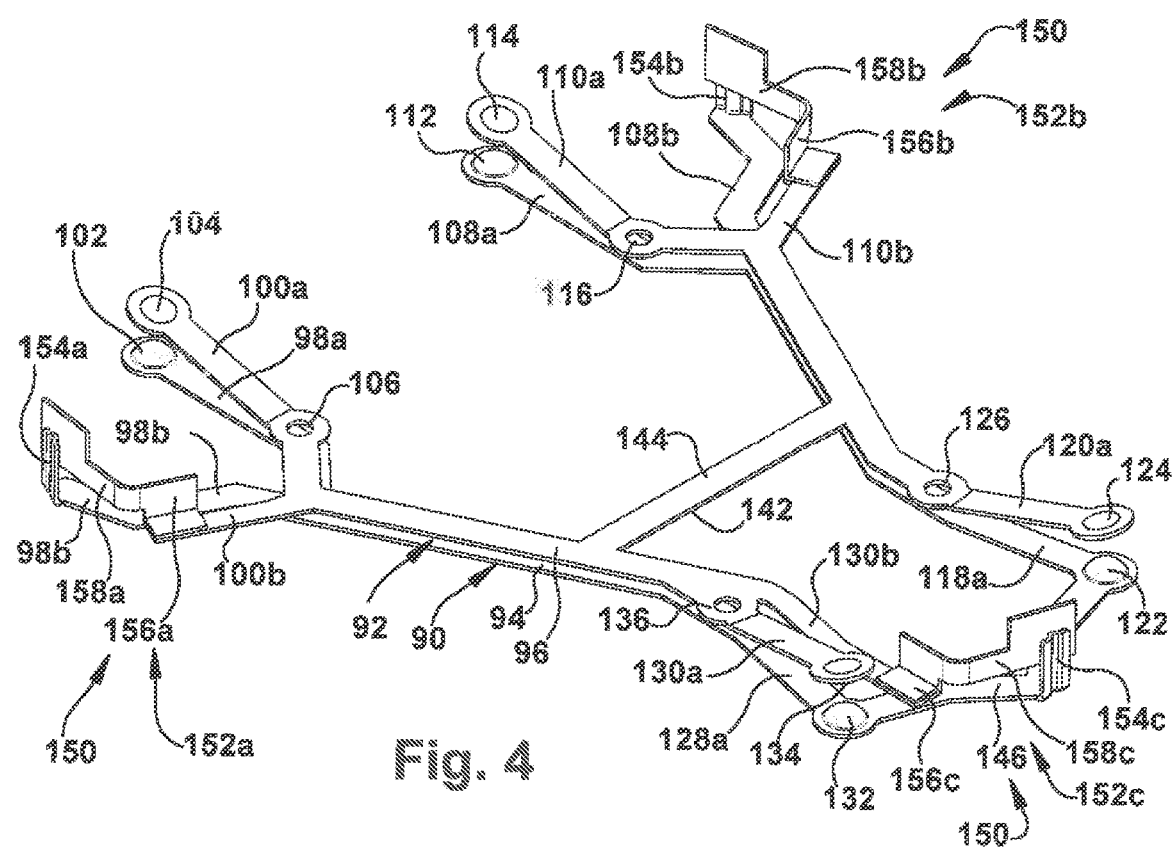
FIG. 4 is a perspective view of a subset of the components of FIG. 3.
Figure 5:
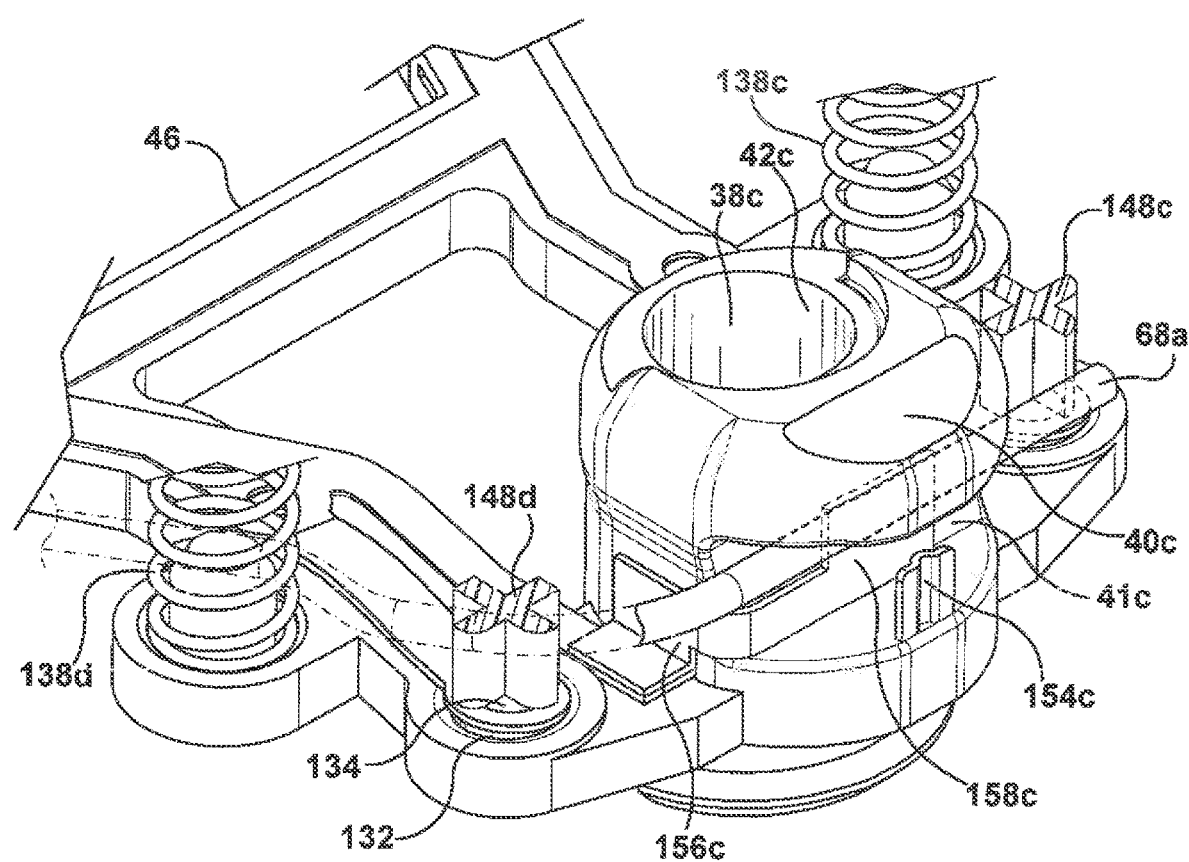
FIG. 5 is an enlarged perspective view showing a latch member of the airbag module of FIG. 2 engaged with a portion of the vehicle steering wheel of FIG. 1.
Figure 6:
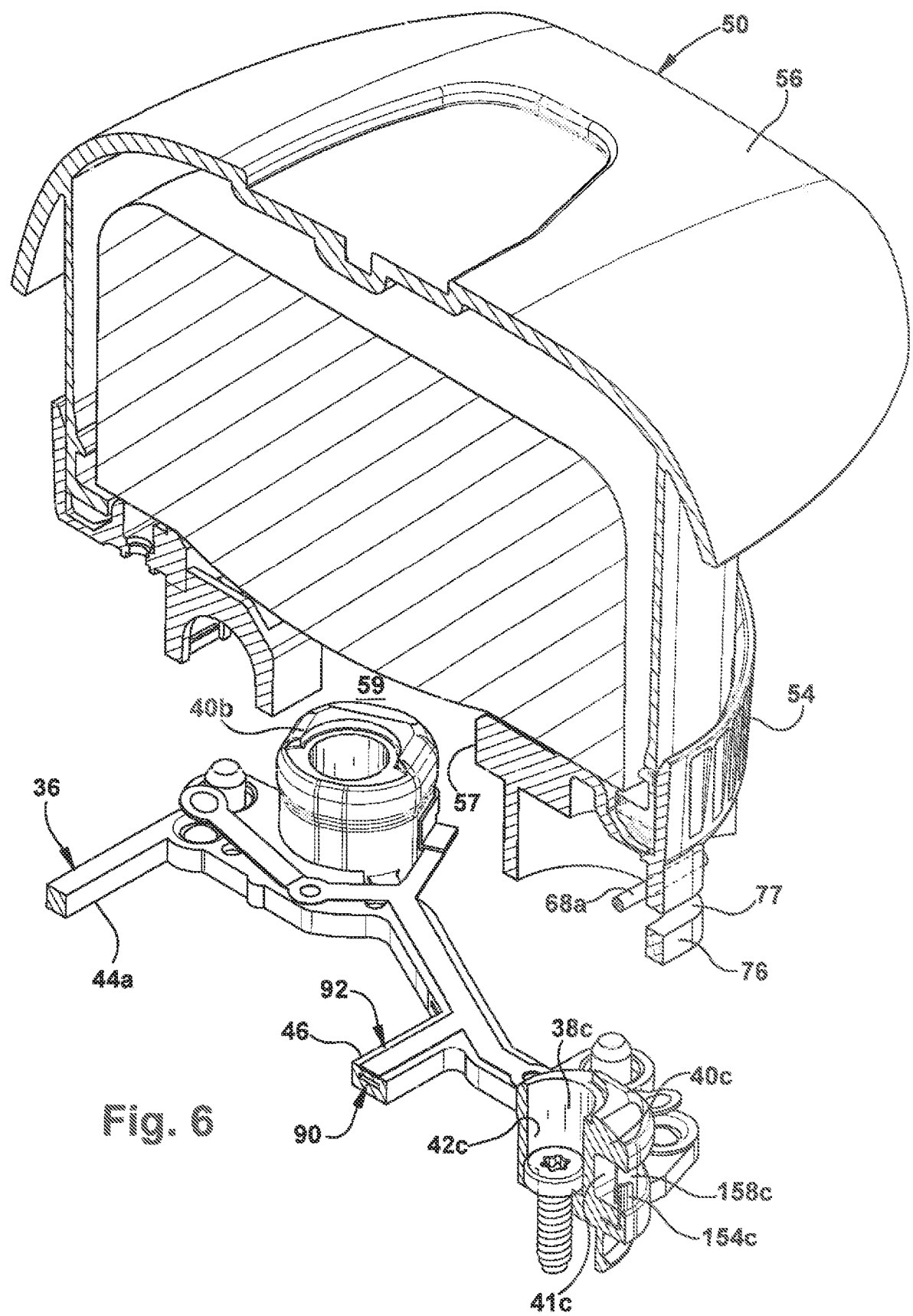
FIG. 6 is a perspective view, partially in section, showing the position of the latch mechanism of FIG. 5 prior to mounting of the air bag module of FIG. 2 on the vehicle steering wheel of FIG. 1.

As can be seen in FIGS. 3 and 4, the switch mechanism 88 includes two flat electrical traces or conductors 90 and 92. The overall shape of each of the electrical conductors 90 and 92 resembles an H. Each of the electrical conductors 90 and 92 incorporates an electrically conductive core (not shown), which may be fabricated of an electrical conductive metal, such as copper or aluminum. The electrically conductive core (not shown) of each of the electrical conductors 90 and 92 is covered with or encased by a layer 94 or 96 of an electrically insulating material, such as a plastic. The two electrical conductors 90 and 92 may thus be positioned and mounted on the steering wheel 12 next to or on top of one another. As shown in FIGS. 3 and 4, the electrical conductor 92 overlies or lies on top of the electrical conductor 90. The electrical conductor 90 is mounted on or connected to the frame 36 by being molded into the frame along the reinforcing portion 46 (as can be seen in FIG. 6) and the three connecting portions 44*a*, 44*b*, and 44*c*. The electrical conductor 92 is joined to the electrical conductor 90 by heat staking. The electrically conductive core (not shown) of the electrical conductor 90 and the electrically conductive core (not shown) of the electrical conductor 92 are electrically connected by, for example, mechanical connectors or soldering to the electrical conductors 84 and thus form a portion of the electrical circuit 86 that includes the vehicle horn 80 and the electrical power source 82.

Although the electrical conductors 90 and 92 have overall shapes resembling an H, two of the ends of the uprights or legs of the H shape of the electrical conductor 90 are branched or forked, as are three of the ends of the uprights or legs of the H shape of the electrical conductor 92. More particularly, as best seen in FIG. 4, the end of the leg of the electrical conductor 90 located in the upper left of FIG. 4 has two branches or forks 98*a* and 98*b* spaced laterally apart from one another. The end of the corresponding leg of the electrical conductor 92 also has two branches or forks 100*a* and 100*b* spaced laterally apart from one another. The fork 100*a* of the electrical conductor 92 is positioned above and is oriented in alignment with the fork 98*a* of the electrical conductor 90. The fork 100*b* of the electrical conductor 92 is positioned above, but is offset to one side of the fork 98*b* of the electrical conductor 90.

At the tip of the fork 98*a* of the electrical conductor 90 is an electrical contact 102, which may be formed as a dimple on or a raised portion of the electrical conductor 90. At the tip of the fork 100*a* of the electrical conductor 92 is an electrical contact 104, which may be formed as a dimple on or a raised portion of the electrical conductor 92. The electrical contacts 102 and 104 are not covered with or encased by the layers 94 and 96 of electrically insulating material that cover or encase the remainder of the electrical conductors 90 and 92, respectively. The electrical contacts 102 and 104 are normally spaced apart from one another. More particularly, the fork 100*a* of the electrical conductor 92 is formed to be resiliently biased away from the fork 98*a* of the electrical conductor 90, from the tip of the tip of each of the forks 98 and 100*a* to a point 106 at which the electrical conductors 90 and 92 are heat staked to one another.

Like the end of the leg of the electrical conductor 90 located in the upper left of FIG. 4, the end of the leg of the electrical conductor 90 located in the upper right of FIG. 4 has two branches or forks 108*a* and 108*b* spaced laterally apart from one another. The end of the corresponding leg of the electrical conductor 92 also has two branches or forks 110a and 110b spaced laterally apart from one another. The fork 110a of the electrical conductor 92 is positioned above and is oriented in alignment with the fork 108a of the electrical conductor 90. The fork 110b of the electrical conductor 92 is positioned above, but is offset to one side of the fork 108b of the electrical conductor 90.

At the tip of the fork 108a of the electrical conductor 90 is an electrical contact 112, which may be formed as a dimple on or a raised portion of the electrical conductor 90. At the tip of the fork 110a of the electrical conductor 92 is an electrical contact 114, which may be formed as a dimple on or a raised portion of the electrical conductor 92. The electrical contacts 112 and 114 are not covered with or encased by the layers 94 and 96 of electrically insulating material that cover or encase the remainder of the electrical conductors 90 and 92, respectively. The electrical contacts 112 and 114 are normally spaced apart from one another. More particularly, the fork 110a of the electrical conductor 92 is formed to be resiliency biased away from the fork 108a of the electrical conductor 90, from the tip of each of the forks 108a and 110a to a point 116 at which the electrical conductors 90 and 92 are heat staked to one another.

The end of the leg of the electrical conductor 90 located in the lower right of FIG. 4 has only a single branch or fork 118a, and the end of the corresponding leg of the electrical conductor 92 has only a single branch or fork 120a. The branch or fork 120a of the electrical conductor 92 is positioned above and is oriented in alignment with the branch or fork 118a of the electrical conductor 90. At the tip of the branch or fork 118a of the electrical conductor 90 is an electrical contact 122, which may be formed as a dimple on or a raised portion of the electrical conductor 90. At the tip of the fork 120a of the electrical conductor 92 is an electrical contact 124, which may be formed as a dimple on or a raised portion of the electrical conductor 92. The electrical contacts 122 and 124 are not covered with or encased by the layers 94 and 96 of electrically insulating material that cover or encase the remainder of the electrical conductors 90 and 92, respectively. The electrical contacts 122 and 124 are normally spaced apart from one another. More particularly, the branch or fork 120a of the electrical conductor 92 is formed to be resiliently biased away from the branch or fork 118a of the electrical conductor 90, from the tip of each of the forks 118a and 120a to a point 126 at which the electrical conductors 90 and 92 are heat staked to one another.

Like the end of the leg of the electrical conductor 90 located in the lower right of FIG. 4, the end of the leg of the electrical conductor 90 located in the lower left of FIG. 4 has only a single branch or fork 128a. The end of the corresponding leg of the electrical conductor 92, however, has two branches or forks 130a and 130b spaced laterally apart from one another. The fork 130a of the electrical conductor 92 is positioned above and is oriented in alignment with the fork 128a of the electrical conductor 90. The fork 130b of the electrical conductor 92 does not overlie any corresponding fork of the electrical conductor 90.

At the tip of the fork 128a of the electrical conductor 90 is an electrical contact 132, which may be formed as a dimple on or a raised portion of the electrical conductor 90. At the tip of the fork 130a of the electrical conductor 92 is an electrical contact 134, which may be formed as a dimple on or a raised portion of the electrical conductor 92. The electrical contacts 132 and 134 are not covered with or encased by the layers 94 and 96 of electrically insulating material that cover or encase the remainder of the electrical conductors 90 and 92, respectively. The electrical contacts 132 and 134 are normally spaced apart from one another. More particularly, the fork 130a of the electrical conductor 92 is formed to be resiliency biased away from the fork 128a of the electrical conductor 90, from the tip of each of the forks 128a and 130a to a point 136 at which the electrical conductors 90 and 92 are heat staked to one another.

The two uprights or legs of the H shape of the electrical conductor 90 are electrically connected by a cross bar portion 142 of the electrical conductor. Similarly, the two uprights or legs of the H shape of the electrical conductor 92 are electrically connected by a crass bar portion 144 of the electrical conductor. In addition, the branches or forks 118a and 126a of the electrical conductor 90 are electrically connected by a secondary cross bar portion 146 of the electrical conductor. The corresponding branches or forks 120a and 130a of the electrical conductor 92 are not so connected, however.

To actuate the vehicle horn 80, the electrical circuit 86 must be closed or completed. In normal operation of the vehicle horn 80 when the vehicle steering wheel assembly 10 is mounted in a vehicle (not shown), the electrical circuit 86 is closed or completed by moving or bringing one or more of the electrical contacts 104, 114, 124, or 134 of the electrical conductor 92 into contact or engagement with a corresponding, adjacent electrical contact 102, 112, 122, or 132 of the electrical conductor 90. Movement of the electrical contacts 104, 114, 124, and 134 is caused or produced by movement of the driver airbag module 50. More specifically, the driver airbag module 50 is mounted on the steering wheel 12 in a manner such that the driver airbag module may move to a limited extent toward end away from the steering wheel.

Figure 7:
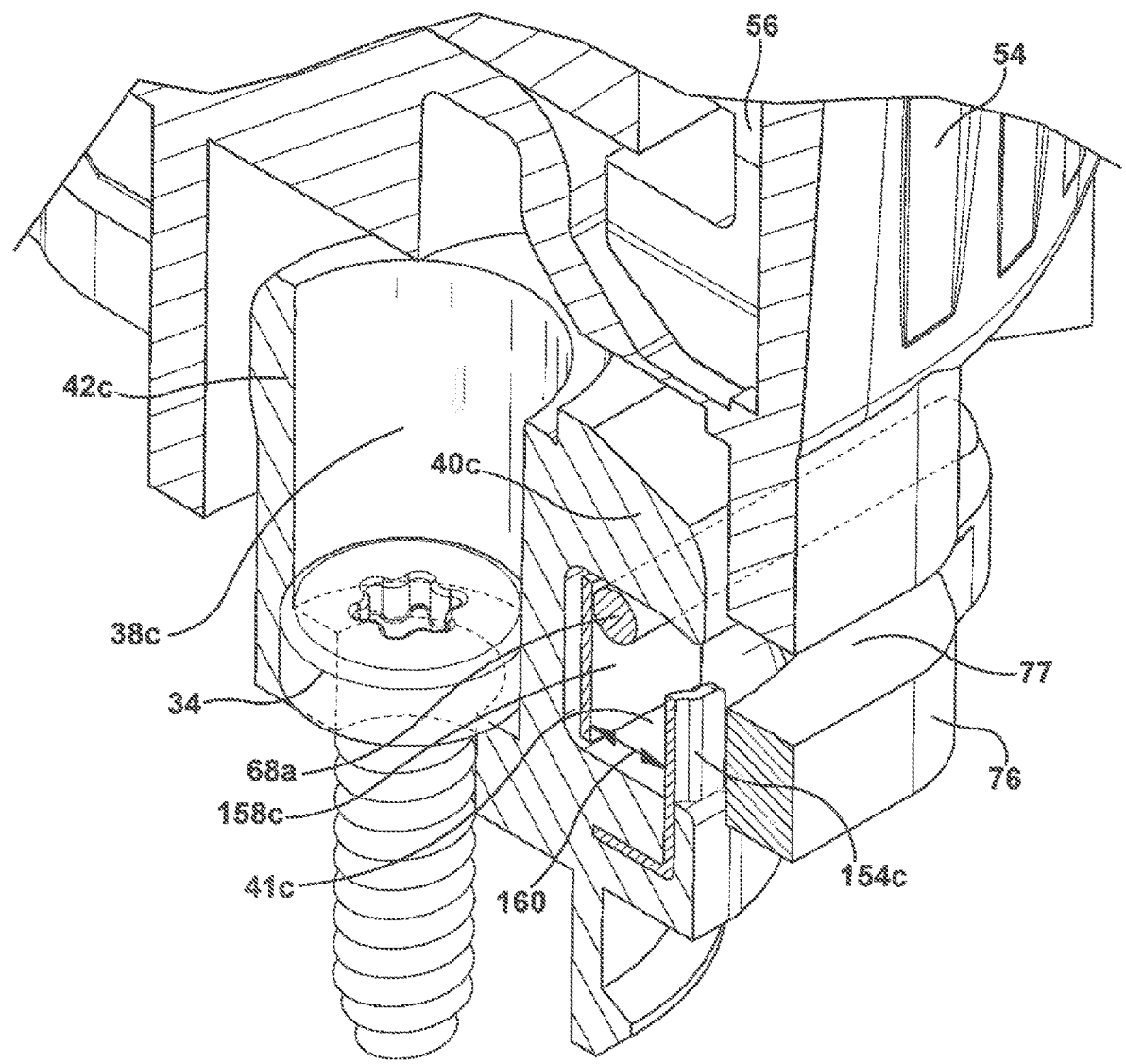
FIG. 7 is an enlarged perspective view, partially in section, similar to FIG. 6 showing the position of the latch mechanism of FIG. 6 after mounting of the air bag module of FIG. 2 on the vehicle steering wheel of FIG. 1.

As can be seen in FIGS. 6 and 7, when the driver airbag module 50 is mounted on the steering wheel 12, the end portion 68a of the spring wire 62a is received in the basket 41c of the hook portion 40c so that the end portion is adjacent to and in contact or engagement with a surface of the hook portion 40c that defines the uppermost part of the basket 41c. Although not shown, the end portions 66a and 66b of the spring wires 62a and 62b are similarly received in the hook portions 40a and 40b, respectively, when the driver airbag module 50 is mounted on the steering wheel 12. The end portions 66a, 66b, and 68a are normally maintained in the foregoing relationship with the hook portions 40a, 40b, and 40c by four mounting springs 138a, 138b, 138c, and 138d, which are shown in FIG. 2 as coil springs, but which may be any suitable type or number of springs. One end of each mounting spring 138a, 138b, 133c, and 138d is attached or connected to the reaction plate 64 of the driver airbag module 50. The opposite end of each mounting spring 138a, 138b, 133c, and 138d is in contact with the frame and is received over a corresponding mounting post 140a, 140b, 140c, or 140d formed on the frame 36. The mounting springs 138a, 138b, 138c, and 138d are thus positioned to bias the driver airbag module 50 away from the steering wheel 12 to the extent permitted by the engagement between the hook portions 40a, 40b, and 40c and the spring wires 62a and 62b. Correspondingly, the driver airbag module 50 may be moved or pressed toward the steering wheel 12 through a limited distance determined by the height of the basket of each hook portion 40a, 40b, and 40c, as exemplified by the height of or vertical distance within the basket 41c of the hook portion 40c shown in FIGS. 6 and 7.

When the driver airbag module 50 is moved or pressed by, for example, a driver of the vehicle (not shown) to ward the steering wheel 12 against the bias of one or more of the mounting sprigs 138a, 138b, 138c, and/or 138d, the reaction plate 54 of the driver airbag module will press down on and move one or more of the branches or forks 100a, 110a, 120a, and 130a of the electrical conductor 92. More specifically, one or more of four plus-shaped or cross-shaped posts 148a, 148b, 148c and 148d, which project from the reaction plate 54 of the driver airbag module 50, will press down on and move one or more of the branches or forks 100a, 110a, 120a, and 130a of the electrical conductor 92. Such downward pressure on and consequent movement of one or more of the branches or forks 100a, 110a, 120a, and 130a will cause one or more of the electrical contacts 104, 114, 124, and 134 to contact or engage a corresponding electrical contact 102, 112, 122, or 132 of the electrical conductor 90 and thereby complete or close the electrical circuit 86 and actuate the vehicle horn 80. When the pressure on the driver airbag module 50 is removed or released, the bias of the mounting springs 138a, 138b, 138c, and 138d will cause the driver airbag module to move away from the steering wheel 12. Such movement of the driver airbag module 50 will, in turn, allow the resilient bias of the branches or forks 100a, 110a, 120a, and 130a of the electrical conductor 92 to move the electrical contacts 104, 114, 124, and 134 away from and out of engagement or contact with the corresponding electrical contacts 102, 112, 122, or 132 of the electrical conductor 90. The vehicle horn 80 will then cease to be actuated.

To facilitate mounting the driver airbag module 50 on the steering wheel 12 in the manner previously described, without requiring visual observation of the interlock or engagement between the spring wire 62a and 82b and the hook portions 40a, 40b, and 40c of the frame 36, the electrical circuit 86 for actuating the vehicle horn 80 may be adapted or supplemented to provide a mounting verification system 150. Specifically, the mounting verification system 150 includes one or more mechanisms connected electrically in parallel with one or more of the pairs of electrical contacts 102 and 104, 112 and 114, 122 and 124, and/or 134 and 136 such that the electrical circuit 86 for actuating the vehicle horn 80 will be completed or closed and thus the vehicle horn will be actuated at all times, that is to say, continuously, when the electrical power source 82 is connected in the electrical circuit 86. More particularly, as shown in FIGS. 3 through 7, the mounting verification system 150 includes three short circuit devices 152a, 152b, and 152c connected electrically in parallel with the pairs of electrical contacts 102 and 104, 112 and 114, 122 and 124, and 134 and 136 of the electrical circuit 86. Each of the short circuit devices 152a, 152b, and 152c is located adjacent to and functions in response to interlocking or engagement of a particular hook portion 40a, 40b, and 40c, respectively, of the frame 36 and its associated end portion 66a, 66b, and 68a, respectively, of the spring wires 62a and 62b.

The short circuit device 152a includes a short circuit electrical contact 154a mechanically secured to and electrically connected to the branch or fork 98b of the electrical conductor 90. As can be seen in FIG. 4, the short circuit electrical contact 154a projects upward and away from the electrical conductor 90. As can best be seen in FIG. 3, the short circuit electrical contact 154a also projects upward through the adjacent hook portion 40a of the frame 36 so as to partially block the throat or opening into the basket 41a of the hook portion 40a.

The short circuit device 152a also includes a short circuit electrical contact 156a mechanically secured to and electrically connected to the branch or fork 100b of the electrical conductor 92. As can be seen in FIG. 4, the short circuit electrical contact 156a projects upward and away from the electrical conductor 92. The short circuit electrical contact 156a has a generally L-shaped flexible and resilient arm portion 158a that extends toward and normally makes electrical contact with the short circuit electrical contact 154a that is electrically connected to the electrical conductor 90. As can best be seen in FIG. 3, the short circuit electrical contact 156a also projects into the throat or opening defined by the adjacent hook portion 40a of the frame 36 so as, in combination with the short circuit electrical contact 154a, to block fully the throat or opening into the basket 41a of the hook portion 40a.

The short circuit device 152b includes a short circuit electrical contact 154b mechanically secured to and electrically connected to the branch or fork 108b of the electrical conductor 90. As can be seen in FIG. 4, the short circuit electrical contact 154b projects upward and away from the electrical conductor 90. Although not visible in FIG. 3, the short circuit electrical contact 154b also projects upward through the adjacent hook portion 40b of the frame 36 so as to partially block the throat or opening into the basket 41b of the hook portion 40b.

The short circuit device 152b also includes a short circuit electrical contact 156b mechanically secured to and electrically connected to the branch or fork 110b of the electrical conductor 92. As can be seen in FIG. 4, the short circuit electrical contact 156b projects upward and away from the electrical conductor 92. The snarl circuit electrical contact 156b has a generally L-shaped flexible and resilient arm portion 158b that extends toward and normally makes electrical contact with the short circuit electrical contact 154b that is electrically connected to the electrical conductor 90. As can best be seen in FIG. 3, the short circuit electrical contact 156b also projects into the throat or opening defined by the adjacent hook portion 40b of the frame 36 so as, in combination with the short circuit electrical contact 154b, to block fully the throat or opening into the basket 41b of the hook portion 40b.

The short circuit device 152c includes a short circuit electrical contact 154c mechanically seared to and electrically connected to the secondary cross bar portion 146 of the electrical conductor 90, which electrically connects the branches or forks 118a and 128a of the electrical conductor 90. As can be seen in FIG. 4, the short circuit electrical contact 154c projects upward and away from the electrical conductor 90. As can best be seen in FIG. 3, the short circuit electrical contact 154c also projects upward through the adjacent hook portion 40c of the frame 36 so as to partially block the throat or opening into the basket 41c of the hook portion 40c.

The short circuit device 152c also includes a short circuit electrical contact 156c mechanically secured to and electrically connected to the branch or fork 130b of the electrical conductor 92. As can be seen in FIG. 4, the short circuit electrical contact 156c projects upward and away from the electrical conductor 92. The short circuit electrical contact 156c has a generally L-shaped flexible and resilient arm portion 158c that extends toward and normally makes electrical contact with the short circuit electrical contact 154c that is electrically connected to the electrical conductor 90. As can be seen in FIG. 3, the short circuit electrical contact 156c also projects into the throat or opening defined by the adjacent hook portion 40c of the frame 36 so as, in combination with the short circuit electrical contact 154c, to block fully the throat or opening into the basket 41c of the hook portion 40c.

Each of the three short circuit devices 152a, 152b, and 152c completes or closes an electrical connection between the electrical conductors 90 and 92. Consequently, when the vehicle horn 80, the electrical power source 82, the electrical conductors 84, and the electrical conductors 90 and 92 are all connected into the electrical circuit 86, each of the three short circuit devices 152a, 152b, and 152c normally completes or closes the electrical circuit 86. In order to open the electrical circuit 86 or render the electrical circuit incomplete, ail three of the short circuit devices 152a, 152b, and 152c must be opened. More specifically, the short circuit electrical contact 156a must be moved away from and out of contact with the short circuit electrical contact 154a, the short circuit electrical contact 156b must be moved away from and out of contact with the short circuit electrical contact 154b, and the short circuit electrical contact 156c must be moved away from and out of contact with the short circuit electrical contact 154c.

The manner in which the short circuit devices 152a, 152b, and 152c are opened can be seen by comparing FIGS. 6 and 7, which show two different conditions of the short circuit device 152c during mounting of the driver airbag module 50 on the steering wheel 12. As shown in FIG. 6, when the driver airbag module 50 is to be mourned on the steering wheel 12, the driver airbag module is turned 180° from the orientation shown in FIG. 2 so that the cover 56 is presented toward the driver seat and away from the steering wheel. The driver airbag module 50 is then positioned relative to the steering wheel 12 such that the hook portion 40c of the frame 36 is generally in alignment with me annular guide member 76. The driver airbag module 50 is moved or pressed toward the steering wheel 12 so that the hook portion 40c is received in the guide member 76.

As the hook portion 40c moves into the guide member 76, the end portion 68a of the spring wire 62a is initially positioned above the hook portion 40c, as viewed in FIG. 6. The hook portion 40c deflects the end portion 69a radially outward away from the center of the reaction plate 54 and then allows the end portion to return, under the resilient bias of the spring portion 64a to its starting position relative to the center of the reaction plate. The foregoing mounting process can be seen by comparing FIGS. 6 and 7, in the course of the mounting process, as the end portion 68a of the spring wire 62a is resiliency biased to its starting position relative to the central opening 59 of the reaction plate 54 and into the basket 41c of the hook portion 40c, the end portion 68a engages and pushes or deflects the arm portion 158c of the short circuit electrical contact 156c into the basket 41c of the hook portion 40c and away from the short circuit electrical contact 154c, as indicated by the gap or space 160 shown in FIG. 7. The end portion 68a of the spring wire 62a also continues to hold the short circuit electrical contact 156c out of contact with the short circuit electrical contact 154c due to the resilient bias of the spring portion 64a of the spring wire 62a, which is greater than and effectively overrides the resilient bias of the arm portion 158c of the short circuit electrical contact 156c.

The engagement between the hook portion 40c and the end portion 68a of the spring wire 62a thus opens the short circuit device 152c. Corresponding and concurrent engagement of the hook portions 40a and 40b with the end portions 66a and 66b, respectively, of the spring wires 62a and 62b will open the other two short circuit devices 152a and 152b and thereby open the electrical circuit 86. The open electrical circuit 86 thus indicates that the driver airbag module 50 is securely mounted to the steering wheel 12. If any one of the short circuit devices 152a, 152b or 152c was not opened, however, the electrical circuit 86 would be closed or completed, and the vehicle horn 80 would be actuated continuously, thereby providing an audible signal that the driver airbag module 50 was not securely mounted on the steering wheel 12.

Although the mechanism for attaching the driver airbag module 50 is described and illustrated as comprising two flexible and resilient latch members 60 in the form of elongated spring wires 62a and 62b attached to the reaction plate 54, the attachment mechanism may include more or fewer latch members and spring wires. For example, there may be a separate latch member for each hook portion 40a, 40b, and 40c. Alternatively, there may be a single latch member comprising a single continuous spring wire that engages ail three hook portion 40a, 40b, and 40c. Also, while the latch members 60 are shown as spring wires 62a and 62b, the latch members may comprise relatively rigid bars or rods biased into position by separate springs. Further, the latch members 60 may comprise a single lock wire that is pushed or pressed into engagement with the hook portions 40a, 40b, and 40c, in a manner similar to what is disclosed, for example, in U.S. Pat. No. 6,554,312, rather than being biased into such engagement by inherent resilience of the wire.

While the electrical circuit 86 described above for actuating the vehicle horn 80 incorporates a so-called "floating horn switch," in which the driver airbag module 50 is moved or pressed through a limited distance to actuate the vehicle horn 80, the horn actuation circuit could alternatively include a membrane horn switch mounted in the airbag cover 56. With a membrane horn switch, the pairs of electrical contacts 102 and 104, 112 and 114, 122 and 124, and 134 and 136 would be eliminated, but the short circuit devices 152a, 152b, and 152c would be retained. The short circuit devices 152a, 152b, and 152c would also continue to be connected to the vehicle horn 80 and the electrical power source 82 and to be connected electrically in parallel with the membrane horn switch.

Although closing or completing the electrical circuit 86 for actuating the vehicle horn 80 requires that the vehicle battery 82 or other electrical power source be electrically connected in the electrical circuit 86, the process of assembling the vehicle steering wheel assembly 10 on an assembly line may require that the driver airbag module 50 be mounted on the steering wheel prior in time or earlier on the assembly line than when the vehicle battery 82 is electrically connected in the electrical circuit 86. Consequently, the audible signal indicating that the driver airbag module 50 is not securely mounted on the steering wheel 12 may not sound until a period of time after the driver airbag module is mounted on the steering wheel.

From the above description of the invention, those skilled in the art will perceive improvements, changes and modifications. Such improvements, changes, and/or modifications within the skill of the art are intended to be covered by the appended claims.

Having described the invention, the following is claimed:

1. A driver airbag mounting verification system comprising a portion of an electrical circuit configured to connect a vehicle horn to a vehicle-mounted electrical power source, the portion of the electrical circuit being mounted on one of a driver airbag module and a vehicle steering wheel and including two electrical contacts resiliently biased into contact with one another prior to the driver airbag module being mounted on the vehicle steering wheel so as to complete the electrical circuit and thereby to actuate the vehicle horn, at least one of the two electrical contacts being mounted such that said at least one of the two electrical contacts is moved and held out of contact with the other of the two electrical contacts in response to the driver airbag module being securely mounted on the vehicle steering wheel.

2. A driver airbag mounting verification system according to claim 1 wherein a latch member moves between the two electrical contacts and holds the at least one of the two electrical contacts out of contact with the other of the two electrical contacts in response to the driver airbag module being securely mounted on the vehicle steering wheel.

3. A driver airbag mounting verification system according to claim 2, wherein the latch member is mounted on the other of the driver airbag module and the vehicle steering wheel.

4. A driver airbag mounting verification system according to claim 3, wherein the latch member engages a hook member when the driver airbag module is securely mounted on the vehicle steering wheel, the hook member being mounted on the one of the driver airbag module and the vehicle steering wheel.

5. A driver airbag mounting verification system according to claim 3, wherein the latch member engages a plurality of hook members when the driver airbag module is securely mounted on the vehicle steering wheel, the plurality of hook members being mounted on the one of the driver airbag module and the vehicle steering wheel.

6. A driver airbag mounting verification system according to claim 3, wherein the latch member is one of a plurality of latch members, the plurality of latch members engaging a plurality of hook members when the driver airbag module is securely mounted on the vehicle steering wheel, the plurality of hook members being mounted on the one of the driver airbag module and the vehicle steering wheel, the plurality of latch members being mounted on the other of the driver airbag module and the vehicle steering wheel.

7. A driver airbag mounting verification system according to claim 1, wherein the latch member is resilient.

8. A driver airbag mounting verification system comprising:
   (a) a portion of a horn actuation circuit configured to connect a vehicle horn to a vehicle-mounted electrical power source, the portion of the horn actuation circuit including plural first electrical contacts that are normally spaced apart, the horn actuation circuit being electrically completed so as to actuate the vehicle horn when at least two of the first electrical contacts that are normally spaced apart are brought into contact with one another; and
   (b) a short circuit device electrically connected in parallel with said at least two of the first electrical contacts that are normally spaced apart, the short circuit device being mounted on one of a driver airbag module and a vehicle steering wheel and including two second electrical contacts resiliently biased into contact with one another prior to the driver airbag module being mounted on the vehicle steering wheel so as to complete the horn actuation circuit and thereby to actuate the vehicle horn, at least one of the two second electrical contacts being mounted such that said at least one of the two second electrical contacts is moved and held out of contact with the other of the two second electrical contacts in response to the driver airbag module being securely mounted on the vehicle steering wheel.

9. A driver airbag mounting verification system according to claim 8 wherein a latch member moves between the two second electrical contacts and holds the at least one of the two second electrical contacts out of contact with the other of the two second electrical contacts in response to the driver airbag module being securely mounted on the vehicle steering wheel.

10. A driver airbag mounting verification system according to claim 9 wherein the latch member is mounted on the other of the driver airbag module and the vehicle steering wheel.

11. A driver airbag mounting verification system according to claim 10 wherein the latch member engages a hook member when the driver airbag module is securely mounted on the vehicle steering wheel, the hook member being mounted on the one of the driver airbag module and the vehicle steering wheel.

12. A driver airbag mounting verification system according to claim 10, wherein the latch member engages a plurality of hook members when the driver airbag module is securely mounted on the vehicle steering wheel, the plurality of hook members being mounted on the one of the driver airbag module and the vehicle steering wheel.

13. A driver airbag mounting verification system according to claim 10, wherein the latch member is one of a plurality of latch members, the plurality of latch members engaging a plurality of hook members when the driver airbag module is securely mounted on the vehicle steering wheel, the plurality of hook members being mounted on the one of the driver airbag module and the vehicle steering wheel, the plurality of latch members being mounted on the other of the driver airbag module and the vehicle steering wheel.

14. A driver airbag mounting verification system according to claim 8, wherein the latch member is resilient.

* * * * *